3,830,908
ANTI-MICROBIAL COMPOSITIONS UTILIZING
ALLANTOIN COMPOUNDS AND COMPLEXES
Allen P. Klippel and Harry W. Margraf, Clayton, Mo.,
assignors of fractional part interest to Harry W.
Margraf and Allen P. Klippel, St. Louis, Mo.
No Drawing. Filed July 23, 1971, Ser. No. 165,753
Int. Cl. A61f 13/00; A61k 27/00
U.S. Cl. 424—28           5 Claims

ABSTRACT OF THE DISCLOSURE

The disclosure relates to a composition in which micronized allantoin serves as a diluent or carrier for a bactericidal or bacteriostatic ingredient, such as silver citro allantoinate, and/or for a fungicidal or fungistatic ingredient, such as a zinc compound. The composition is particularly useful when dispersed on the surface of a plastic air splint or other bandaging or wrapping product, rendering it continuingly safe for use despite storage under unsterile conditions.

CROSS REFERENCE TO RELATED APPLICATIONS

Bacteriostatic and fungistatic compounds utilized herein and the methods of preparing same are disclosed in copending applications, Ser. No. 165,737 filed July 23, 1971 and Ser. No. 165,736 filed July 23, 1971.

BACKGROUND OF THE INVENTION

Allantoin is a nitrogen containing compound of the formula $C_4H_6N_4O_3$, and has a structural formula as follows:

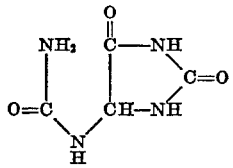

This compound stimulates cell proliferation and tissue growth. Its healing properties are assisted by the fact that it is mildly keratolytic and is a protein disperant. It also debrides necrotic and scaly tissue and is known to have a soothing, pain relieveing action. However it is acidic when applied to the aqueous surface of a wound.

Chemically, allantoin is an amphoteric substance, that is, it will combine with either a base or an acid to form a salt. For example, allantoin is able to complex with silver salts of physiological organic acids.

SUMMARY OF THE INVENTION

New anti-microbial compositions are here provided by using allantoin in the form of a finely divided powder, as a carrier and diluent. Used with low solubility silver salts, as herein described, the allontoin serves in part to avoid wasting active silver ions; in the absence of the allantoin, these would combine with dead tissue around the wound.

Zinc sulf-hydroxy allantoinate is an alkaline complex. When combined with allantoin, as herein specified, the resulting powdered mixture will, in aqueous media, be substantially neutral and non-irritating. The zinc compound is fungicidal, or in small concentrations, fungistatic.

Zinc sulf-hydroxy allantoinate is prepared as follows:

Into 2 liters of hot distilled water, at 80° C., are introduced 65 gms. of chemically pure allantoin and 242 gms. of zinc sulfate. The zinc sulfate has the formula $ZnSO \cdot 7H_2O$; and 242.0 gm. yields 55 gm. zinc ions and 80 gm. sulfate ions.

The clear solution is filtered to remove any contaminate. 14 gm. OH— is required; this is supplied by 90 cc. of concentrated 28 percent solution of ammonia. Precipitation is continued until the pH of the reaction mixture reaches 7.5. Instead of using ammonia, the hydroxyl ions may be supplied by using equivalent amount of a mono-valent alkali such as sodium hydroxide or potassium hydroxide.

The precipitate is isolated by filtration under vacuum. The precipitate is washed twice with cold (4° C.) distilled water. Air or vacuum drying yields 165 ± 5 gm. of white crystalline material; this yield represents approximately 95 percent of the theoretical yield. The crystalline material is then reduced to a fine powder, preferably micronized.

The product has the following structural formula:

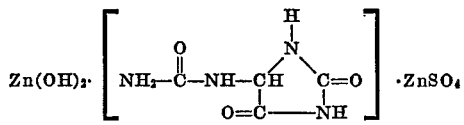

Its molecular weight is 418, zinc content being 31 percent. The above described complex is a highly effective fungicidal or fungistatic agent, depending on the concentration used. Its solubility in water at 25° C. is 0.075 percent; this increases in the presence of products of normal microbial metabolism. Two parts of it will neutralize 98 parts allantoin in aqueous solution. Two parts of the present complex, two parts of allantoinate of a silver salt, and 96 parts of allantoin forms one of the useful bacteriostatic, fungistatic compositions useful in this invention.

Zinc sulf-hydroxy allantoinate may be applied by spraying unto a wound, as a gel, as a cream, or by painting or dusting unto a surface. Its many utilizations will be apparent to persons skilled in the art.

Silver salts of physiological organic acids provide silver in a readily usable form to be liberated slowly as needed. Silver salts of physiological organic acids provide allantoin compounds of silver in a form most physiologically acceptable. In addition, these complexes incorporate a normally unstable silver salt of a physiological organic acid in a stable composition which does not decompose or blacken when exposed to sunlight or air.

The physiological organic acid silver salts of allantoin are formed by the reaction of silver, of a physiological organic acid, and allantoin. The term "physiologic organic acid" is here used to mean those acids occurring or taking part in normal metabolic processes. The compounds so formed are physiologically compatible with the human body; they are safely administered to open wounds and severe burns. Their presence and their substitution for other ingredients avoids chemical reactions which might be harmful or irritating. The physiological organic acids which form silver-organic acid-allantoin complexes include: acetic, lactic, pyruvic, citric, stearic and palmitic acids, and the amino acids.

Silver lacto allantoinate and silver citro allantoinate are preferred examples of physiological organic acid silver salts of allantoin. Silver lacto allantoin is prepared by dissolving 25 gm. of allantoin in one liter of hot water (75° C.) to which 400 ml. of silver lactate (6 percent filtered solution) providing 12 gm. Ag+ are added.

The reaction mixture is completely cooled at room temperature and then transferred to a refrigerator (4° C.) for 1 hour.

A white, crystalline, heavy precipitate results, which is filtered off, washed with cold (4° C.) distilled water containing 1 percent hydrogen peroxide, and dried in an incubator at 37° C. or a vacuum-desiccator.

The yield is 30 gm. of chemically pure, white material, representing 83.5 percent of the theoretically expected amount. The structural formula of the reaction product is as follows

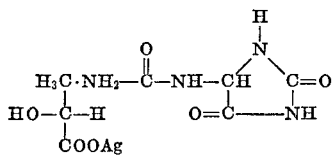

Its molecular weight is 355. Its silver content is 30.5 percent. Its solubility in water at 25° C. is 0.2 percent; this increases in the presence of products of normal microbial metabolism.

Silver citro allantoinate is prepared by dissolving a mixture of 75 gms. of sodium citrate, dihydrate which equals 65.5 gm. anhydrous sodium citrate and 25 gms. of allantoin in 1.5 liter of hot distilled water (75° C.) The solution is filtered.

200 ml. of silver nitrate (50 percent solution in distilled water) is added. The 200 ml. of 50 percent silver nitrate equals 63.5 gm. Ag+.

The reaction product is cooled at room temperature, and then further cooled and stored for one hour at 4° C. The resulting precipitate is filtered off, washed with cold water containing 1 percent hydrogen peroxide, and dried in an incubator at 37° C. or a vacuum dessicator.

The precipitate recovered is 120 gms. of crystalline, white material which represents a yield of 96 percent of the theoretical yield. It contains 51 percent silver, 19 percent allantoin, and 30 percent citrate by weight.

The reaction mechanism is as follows:

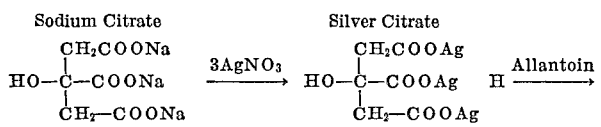

Silver citro allantoinate has the following structural formula:

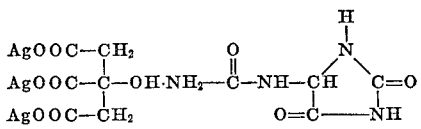

Its molecular weight is 654. Its solubility in water at 25° C. is 0.075 percent; this increases in the presence of normal microbial metabolism.

Silver organic acid allantoinates may be formulated into medicinal products wherein carriers are used. These can be cream or gel bases, powder bases, or an allantoin diluent and carrier.

The present combination with powdered allantoin of a silver organic acid allantoinate and zinc sulf-hydroxy allantoinate is both bacteriostatic and fungistatic, is neutral and non-irritating when applied to wounds, and is substantially non-staining to body tissue, bandages and bedding.

The surfaces of common synthetic flexible plastic sheet materials such as polypropylene and polyethylene tend to have positive electrostatic charges or accumulate such charges during normal handling. We have discovered that micronized allantoin, whose solubility is 0.6% at 25° C., tends to bind silver salts and zinc salts to the plastic surface, especially when applied as a coating in the presence of moisture. The composition will adhere to the surface during ordinary conditions of use.

In one aspect, the present invention includes new products for packaging and bandaging, specifically, flexible plastic sheet material which has been coated with one of the compositions of this invention and thus rendered continuously sterile, bacteriostatic and fungistatic. One of the bandaging products is an otherwise conventional inflatable pneumatic splint, which may be stored under unsterile conditions and remain suitable for use even on open wounds.

DETAILED DESCRIPTION

Silver compounds best suited for use in this invention are the low solubility silver salts of physiological organic acids, meaning those acids occurring or taking part in normal metabolic processes. These include silver citrate, silver allantoinate, silver citro allantoinate, silver lacto allantoinate, silver pyruvic allantoinate, silver stearate and other fatty acid salts of silver whose solubility in water at room temperature is less than 0.5%. These silver compounds are not freely ionized and are relatively light insensitive. The preferred zinc compound is the zinc sulfhydroxy allantoinate. Other zinc compounds suitable for use with the invention include zinc stearate and other fatty acid salts of zinc, zinc oxide, and zinc undecylenate.

Allantoin powder is the base of the composition and comprises from about 75.0% to about 99.9% by weight of the composition. This proportion exceeds the actual amount of allantoin necessary to maintain the physiological properties of the mixtures. However the use of so large a quantity of allantoin is preferred, rather than admixture with other ingredients, because it insures against any reaction with such other ingredients, to form foreign compounds, also because the solubility of allantoin, as compared with ordinary carriers, afford sure adherence to plastic materials in the presence of moisture. In applications in which these factors may not be important, conventional diluents may be substituted for portions of the allantoin; e.g. up to about 80% of the allantoin may be substituted by other relatively inert diluents. The physiological organic acid silver allantoinate constitutes from about 0.1% to not more than 25% by weight of the composition. The zinc salt likewise constitutes from about 0.1% to not more than 5% of the composition.

A preferred composition is 96% allantoin, 2% silver citro allantoinate, and 2% zinc sulf-hydroxy allantoinate. These materials are powdered and dry mixed to compound the mixture. The powder size of each may be in the range of from 60 to approximately 300 mesh; preferably the powder is micronized to between 200–300 mesh. The moisture content of the composition is not critical but should be as low as possible for stability.

Following are other specific formulations utilizing the invention. In each case the percentages shown are by weight.

Example No. 1

| | Percent |
|---|---|
| Silver citrate | 0.1–5.0 |
| Allantoin, micronized | 95.0–99.9 |

Example No. 2

| | |
|---|---|
| Silver lacto allantoinate | 0.2–5.0 |
| Allantoin | 95.0–99.8 |

Example No. 3

| | |
|---|---|
| Silver citro allantoinate | 0.2–5.0 |
| Allantoin | 95.0–99.8 |

Example No. 4

| | |
|---|---|
| Zinc sulf-hydroxy allantoin | 2.0–20.0 |
| Allantoin | 80.0–98.0 |

Example No. 5

| | |
|---|---|
| Zinc stearate | 2.0–20.0 |
| Allantoin | 80.0–98.0 |

Example No. 6

| | |
|---|---|
| Silver stearate | 0.5–5.0 |
| Allantoin | 95.0–99.5 |

Example No. 7

| | |
|---|---|
| Zinc stearate | 2.0–20.0 |
| Silver stearate | 0.5–5.0 |
| Allantoin | 75.0–97.5 |

Example No. 8

| | |
|---|---|
| Zinc sulf-hydroxy allantoinate | 2.0–20.0 |
| Silver lacto allantoinate | 0.2–5.0 |
| Allantoin | 75.0–97.8 |

Example No. 9

| | |
|---|---|
| Zinc sulf-hyroxy allantoinate | 2.0–20.0 |
| Silver citro allantoinate | 0.2–5.0 |
| Allantoin | 75.0–97.8 |

Example No. 10

| | |
|---|---|
| Silver citrate | 0.1–5.0 |
| Zinc sulf-hydroxy allantoinate | 2.0 |
| Allantoin | 93.0–97.9 |

In solution, allantoin is acidic, while zinc sulf-hydroxy allantoinate is alkaline. When two parts of the latter are combined with 98 parts of allantoin, aqueous solutions will be substantially neutral.

One exemplary product incorporating the present invention is an anti-microbial pneumatic splint. Such splints are air-inflatable and are fabricated from sheet material, utilizing one of the synthetic plastics whose surface accumulates positive electrostatic charges in the course of normal handling. Its entire surface is coated with one of the preferred compositions hereof, for example, 96% allantoin, 2% silver citro allantoinate, and 2% zinc sulf-hydroxy allantoinate, mixed together dry. Enough water is mixed with them to bring them into suspension; then the mixture is applied evenly over the exterior surfaces of the air splint, and permitted to dry. An adequate coating s formed by using approximately two grams of dry composition per square foot of surface area. After the coating has dried, it remains dispersed over the surface, and will cling to it despite normal handling, due in part to the attraction exerted by the positive charges on the plastic surface.

An air splint or other bandaging plastic sheet product, when so treated, can be packed and stored under conditions which do not insure sterility; for example, it may be loosely stored in an ambulance or police vehicle for long periods at a time. The coating renders the bandaging product continuingly self-sterilized, serving to kill such bacteria and fungi as are encountered from time to time. Such products as well as bags and wrapping materials so coated will remain bacteriostatic and fungistatic for long periods of time. The term "enveloping product" as herein used includes such wrapping products and bandaging products including air splints.

We claim:

1. An anti-microbial composition comprising allantoin as a carrier in small particulate form, in which the allantoin comprises at least 75 percent of the composition, and
an ingredient selected from the group consisting of
(A) a physiologically compatible organic acid silver salt allantoin complex in a bacteriostatically effective amount,
(B) zinc sulf-hydroxy allantoinate of the following formula in a fungistatically effect amount:

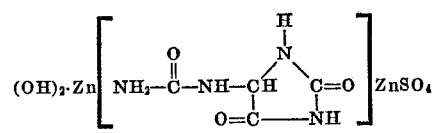

and
(C) mixtures thereof.

2. The composition of Claim 1 wherein the bacteriostatically effect ingredient is silver citro allantoinate.
3. The composition of Claim 1 wherein the bacteriostatically effective ingredient is silver lacto allantoinate.
4. A bandaging composition comprising a flexible synthetic plastic sheet portion of a type having or accumulating positive electrostatic surface charges, and a finely divided powdered coating thereon, the coating comprising at least 75 percent allantoin as a carrier in small particulate form, and
an ingredient selected from the group consisting of
(A) a physiologically compatible organic acid silver salt allantoin complex in a bacteriostatically effective amount,
(B) zinc sulf-hydroxy allantoinate of the following structural formula in a fungistatically effective amount:

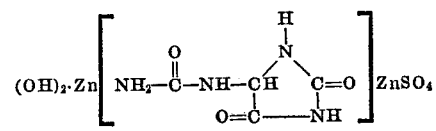

and
(C) mixtures thereof.

5. The composition defined in Claim 4 wherein the synthetic plastic sheet portion is selected from the group consisting of polyethylene and polypropylene.

References Cited

UNITED STATES PATENTS

| | | | |
|---|---|---|---|
| 2,689,809 | 9/1954 | Fessler | 424—28 X |
| 3,092,552 | 6/1963 | Romans | 424—28 |
| 3,551,557 | 7/1964 | Garcia | 424—28 |

OTHER REFERENCES

Sagarin: "Cosmetics, Science & Technology" interscience Pub. (1952), pp. 161–2 and 848.

Chemical Abstracts 47: 4843c (1943).

ALBERT T. MEYERS, Primary Examiner

L. SCHENKMAN, Assistant Examier

U.S. Cl. X.R.

424—245, 273, 289, 290